UNITED STATES PATENT OFFICE.

LEWIS HARPER, OF RICEVILLE, NEW JERSEY.

IMPROVEMENT IN FERTILIZERS.

Specification forming part of Letters Patent No. 26,985, dated January 31, 1860.

*To all whom it may concern:*

Be it known that I, LEWIS HARPER, of the Highlands of Neversink, near Riceville, county of Monmouth, State of New Jersey, have invented a new and Improved Method of Preparing a Fertilizer of the Green-Sand Marl of the Cretaceous Formation; and I do hereby declare that the following is a full and exact description thereof, reference being had to the accompanying specimen of the fertilizer.

The nature of my invention is to provide the agricultural public with a superior fertilizer, the basis of which is the green-sand marl of the cretaceous formation and other chloritic marls of the tertiary formations, found in abundance in some of the Middle and Southern States.

To enable others skilled in chemistry to make use of my invention, I will now proceed to describe process and operation of it.

The marl to be used for the basis of the fertilizer is most conveniently dug in the fall previous and exposed during the winter in a layer not more than from twelve to eighteen inches thick to the disintegrating influence of the atmosphere. The frost disintegrates it then completely and reduces it to a pulverulent state.

In order to prepare the fertilizer, a layer of marl from two to two and one-half inches in thickness is spread on the floor of a shed open on all sides, but provided with a roof to protect the material from washing atmospherical precipitations. Over this substratum of marl a layer of any nitrogenous matter, or offal from slaughtered animals, dead animals, fish, molluscous or crustaceous animals, &c., is spread in sufficient quantity. I have generally selected for that purpose the bony fish mossbunkers or menhaden, which visit the Atlantic coast of the United States in abundance, or the *Limulus* or king-crab. Whenever I have selected fish I have found it most convenient to reduce them in spring and in the fall, where decomposition proceeds slower, to a pulp.

In order to impregnate the fertilizer with a sufficient quantity of ammonia, I take to every one thousand pounds of the dry marl one thousand two hundred pounds of fish, and form a substratum of a part of the said one thousand pounds of marl, upon which I lay the fish, and cover them with such a quantity of marl that the substratum and the cover amount to one thousand pounds. The nitrogenous matter is then only very imperfectly covered, and the nascent ammonia would escape if no other cover were used. If the nitrogenous matter has remained covered in that manner for a few days, until decomposition commences, I spread over the bed a quantity of the marl impregnated with a sufficient quantity (about thirty per cent.) of sulphate and nitrate of soda and potash, which is previously prepared by depositing a certain quantity of the marl upon an open platform and spreading the alkaline matter over it. The rain and other atmospheric precipitations soon dissolve the alkaline matter and incorporate it with the marl. For a dry season I moisten the alkaline matter frequently with water. From this alkaline marl I use as much as necessary for the vegetables for which the fertilizer is destined—generally from three hundred to four hundred pounds for every one thousand two hundred pounds of fish and one thousand pounds of marl. I leave the mass for a few days in that state until the decomposition is more advanced, and spread then over it from four hundred to eight hundred pounds (according to the vegetation for which the fertilizer is used) of marl mixed with a variable quantity of bone-dust dissolved in an excess of sulphuric acid, and therewith reduced to biphosphate and sulphate of lime and magnesia. The nascent ammonia is therewith partly converted into a sulphate by the excess of the acid and partly into a double salt with phosphoric acid. The mass remains in this state until neutralization of the excess of acid has taken place and the ammonia commences to escape. When this takes place sulphate of lime is at different times (as often as necessary to fix the ammonia completely) sprinkled over the bed until the decomposition is completed and no more ammonia is evolved. This requires about one hundred pounds of sulphate of lime for every one thousand pounds of marl mixed with one thousand two hundred pounds of fish.

During the above processes the mass is frequently moistened with water, in order to accelerate decomposition and furnish the hydro gen to combine with nitrogen for the formation of ammonia. When the bed is too compact it is carefully loosened, in order to admit the air and furnish the oxygen necessary for decomposition. Toward the end of the decomposition the mass is repeatedly turned, in order to mix the different materials. When the decomposition is entirely completed and the fertilizer ready it is completely dried in a drying-shed, then ground, and ready for use.

Concerning my invention, I disclaim expressly the invention of the use of the cretaceous marl in combination with nitrogenous matters. I disclaim even the invention of the formation of ammonia-beds in general.

What I claim, and desire to secure by Letters Patent, is—

The method or process of making a fertilizer by the employment of the herein-described substances in the manner set forth, consisting of the series of steps specified, and resulting in a single compound or mixture, substantially as and for the purposes described.

LEWIS HARPER, LL. D.

Witnesses:
  H. POMEROY,
  RICHARD SKIDMORE.